United States Patent [19]

Barrett et al.

[11] Patent Number: 4,945,509

[45] Date of Patent: Jul. 31, 1990

[54] DUAL LOOK AHEAD MASK GENERATOR

[75] Inventors: Stephen B. Barrett, Williston; John Bula, Essex Junction; Alvar A. Dean, Colchester, all of Vt.

[73] Assignee: International Business Machines Corporation, Armonk, N.Y.

[21] Appl. No.: 168,031

[22] Filed: Mar. 14, 1988

[51] Int. Cl.[5] .............................................. G06F 7/00
[52] U.S. Cl. .................................. 364/900; 364/947.4
[58] Field of Search ... 364/200 MS File, 900 MS File

[56] References Cited

U.S. PATENT DOCUMENTS

| 4,012,722 | 3/1977 | Gajski et al. | 364/200 |
|---|---|---|---|
| 4,064,421 | 12/1977 | Gajski et al. | 364/716 |
| 4,139,899 | 2/1979 | Tulpule et al. | 364/900 |
| 4,180,861 | 12/1979 | Armstrong et al. | 364/900 |
| 4,317,171 | 2/1982 | Maejima et al. | 364/200 |
| 4,654,785 | 3/1987 | Nishiyama et al. | 364/200 |
| 4,760,517 | 7/1988 | Miller et al. | 364/200 |
| 4,785,393 | 11/1988 | Chu et al. | 364/200 |

OTHER PUBLICATIONS

IBM Technical Disclosure Bulletin, vol. 26, No. 1, Jun. 1983 S. Barret, J. Bula, A. A. Dean and A. Furman.
IBM Technical Disclosure Bulletin, vol. 27, No. 10A Mar. 1985, Anonymous.
IBM Technical Disclosure Bulletin, vol. 19, No. 7, Dec. 1976, F. T. Blount.

Primary Examiner—David Y. Eng
Attorney, Agent, or Firm—Sughrue, Mion, Zinn, Macpeak & Seas

[57] ABSTRACT

A mask generator for generating a mask having logical signals of a given level between positions indicated by beginning and ending addresses. Two decoders select respective binary signal lines indicating the starting and ending positions. The mask generator is composed of two mask generators operating on the higher and lower order binary signal lines respectively and which ripple from the ends of the mask towards the middle. Preferably, each of the dual mask generators has look-ahead carry capability.

10 Claims, 4 Drawing Sheets

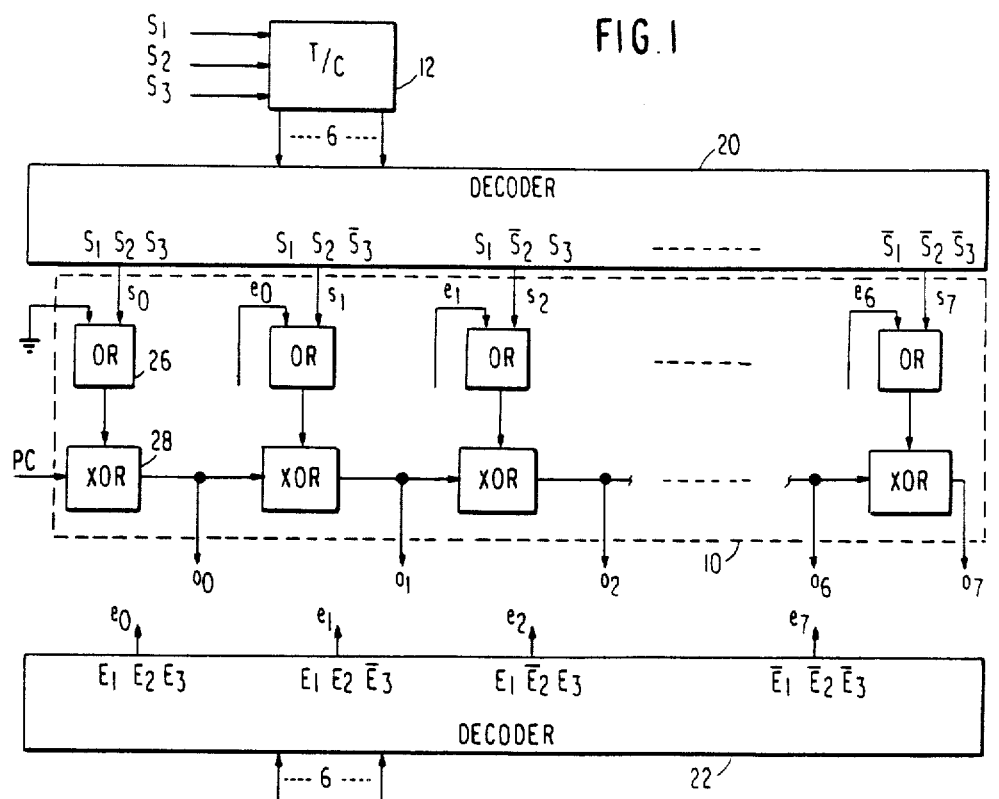
FIG. 1
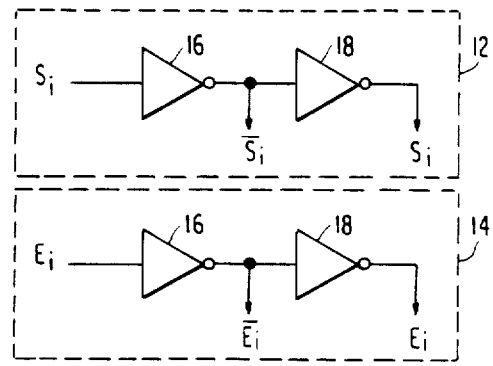
FIG. 2
FIG. 3

DUAL LOOK AHEAD MASK GENERATOR

BACKGROUND OF THE INVENTION

1. Field of the Invention

The invention relates generally to electronic logic circuits. In particular, the invention relates to a mask generator.

2. Background Art

A mask generator is a well known circuit which is particularly useful in processing instructions or data words in a processor for a digital computer. As is described by Armstrong et al. in U.S. Pat. No. 4,180,861, the processor must operate upon only a particular field of a given data word. One efficient method of accomplishing this selective operation is to create a mask which has one logic level, generally represented by a 1, for those bits which are to be processed and the other logic level, generally represented by a 0, for those bits which will be inhibited. The word and the mask are passed through an array of AND gates and only those bits of the word located at positions corresponding to the 1's of the mask can have nonzero values. Generally, only a single contiguous field is thus selected but the field may begin and end at different locations.

It has become common to generate the mask during execution of the processor based upon the starting address S and the ending address E of the field. A new mask needs to be generated at each clock cycle of the processor. This process is described in the above patent to Armstrong et al. and a technical article entitled "Mask Generator for 32-bit Microprocessors" appearing in the IBM Technical Disclosure Bulletin, vol. 27, no. 10A, March 1985, pp. 5696–5698. Naturally, it is desired to generate the mask as quickly as possible with a circuit having as few components as possible.

One way of generating the mask is by means of a ripple circuit 10 as shown in FIG. 1 for an 8-bit mask. The starting address S is represented by 3 bits $(S_1, S_2, S_3)$ and the ending address E is likewise represented by 3 bits $(E_1, E_2, E_3)$. The starting and ending addresses S and E are fed to true and complement circuits 12 and 14 wherein the true and complemented versions of all the input bits $S_i$ and $E_i$ are created by means of inverters 16 and 18 as illustrated in FIG. 2. That is, the true and complement circuit 12 produces six 1-bit signals $S_1$, $\bar{S}_1$, $S_2$, $\bar{S}_2$, $S_3$ and $\bar{S}_3$ for the starting address while the other true and complement circuit 14 produces six similar signals for the ending address.

The respective sets of six 1-bit signals are fed to respective decoders 20 and 22 which act to decode the 3-bit start and ending signals S and E into respective active outputs $s_i$ and $e_j$, marking respectively the beginning and end of the central field. We will stay with the convention that an active output is a 1. The remaining outputs $s_k$ and $e_k$ remain at 0's. The decoders 20 and 22 can be implemented as shown in FIG. 2, each having eight 3-input NAND gates 24. The inputs to the NAND gates are the three bits of the respective starting and ending addresses with the true and complementary versions of each bit being selected to produce the logical output labelled in FIG. 1. It is noted that the numerical designations for $s_0$–$s_7$ and $e_0$–$e_7$ reflect the fact that the starting and ending addresses S and E were expressed in complemented form. The sixteen 1-bit signals $s_i$ and $e_i$ are supplied to the 8-bit ripple circuit 10 which consists of eight stages, each consisting of a 2-input OR gate 26 and a 2-input exclusive-OR gate 28. The i-th OR gate 26 receives the 1-bit starting signal $s_i$ and the next lower numbered 1-bit ending signal $e_{i-1}$. Each exclusive-OR gate 28 receives the output from the OR gate of that stage and the output of the exclusive-OR gate 28 from the previous stage. The output of the exclusive-OR gate 28 for the i-th stage is also the i-th bit $o_i$ of the mask. The ending signal input to the OR gate 26 of the first stage is grounded, that is, an inactive signal or 0. The previous-stage input to the exclusive-OR gate 28 of the first stage is the signal PC. If PC=0, then the produced mask has a central region of 1's surrounded by 0's. If the other convention of PC=1 is chosen, then the produced mask has a central region of 0's surrounded by 1's.

An example of the operation of the mask generator of FIG. 1 will now be given. Assume S=2 and E=5 (in their true versions). Then the outputs of the starting address decoder 20 are all 0's except $s_2=1$, as shown in the Table below. Similarly, the only nonzero output of the ending address decoder 22 is $e_5=1$. Then the inputs to the OR gates 26 of the first two stages, called the zeroeth and first stage, have all zero inputs and the inputs to the exclusive-OR gates 28 of those stages also have zero inputs. Therefore, the first two bits of the mask are $o_0=o_1=0$. However, in the second stage, the OR gate 26 has a nonzero input $s_2=1$. Therefore, its output is a 1 and the exclusive-OR gate 28 of that stage receives a 1 from its corresponding OR gate 26 and a 0 from the previous stage. Therefore, it produces an output $o_2=1$. For the third, fourth and fifth stages, the 1-bit starting and ending signals $s_i$ and $e_i$ to the OR gates 26 are all 1's so that the exclusive-OR gates 28 receive 0's therefrom. However, the exclusive-OR gates of each of the third, fourth and fifth stages receive 1's from the exclusive-OR gate of the previous stage to thereby output 1's, that is, $o_3=o_4=o_5=1$. The effect is that the condition of the second stage has rippled to these later stages. At the sixth stage, however, the OR gate 26 receives a signal $e_6=1$ so that it outputs a 1 to its exclusive-OR gate 28, which is also receiving a 1 from the exclusive-OR gate 28 of the previous stage. Therefore, it outputs $o_6=0$ so that the ripple of 1's is stopped. The last stage receives all zero inputs so that it outputs $o_7=0$. Thereby, the mask shown in the following table is produced.

TABLE

|   | i = | 0 1 2 3 4 5 6 7 |
|---|---|---|
| S = 2 | $s_i$ = | 0 0 1 0 0 0 0 0 |
| E = 5 | $e_i$ = | 0 0 0 0 0 1 0 0 |
| MASK |   | 0 0 1 1 1 1 0 0 |

The above described ripple circuit is feasible for an 8-bit mask. However, difficulties are encountered when it is extended to sixteen and thirty two bit masks. Primarily, each bit or stage introduces one delay period as the signals from the left propagate through successive exclusive-OR gates 28. A thirty two period delay is too long. For this reason, the present inventors and another have disclosed a mask generator incorporating a look-ahead carry.

This mask generator is described by Barrett et al. in a technical article entitled "Four-bit Look-ahead Mask Generator" appearing in the IBM Technical Disclosure Bulletin, vol. 26, no. 1, June 1983, pp. 197 and 198. This 32-bit mask generator is illustrated in FIG. 4 in a form slightly different from that disclosed. The true and complementary circuits 12 and 14 and the decoders 20 and 22 are the same as those of FIG. 1 except for the expansion necessary for the 5-bit starting and ending addresses S and E. The thirty two bit mask generator is divided into eight 4-bit stages. Each stage consists of a 4-bit ripple circuit 30 and a 4-bit look ahead circuit 32. However, the last stage does not require a look ahead circuit. The connections to the ripple circuits 30 and the look ahead circuits 32 are as illustrated.

Each 4-bit ripple circuit 30 is similar to the ripple circuit 10 of FIG. 1 and is illustrated in FIG. 5 with the connections required for the first stage on the left. Its structure and operation have been previously described with reference to FIG. 1 and will not be repeated. For further stages, the grounded connection to the leftmost OR gate 30 is replaced by the lowest numbered ending address bit signal $e_i$ and the polarity change signal PC is replaced by a signal $o'_i$ from the look ahead circuit 32 of the previous stage.

Each 4-bit look ahead circuit 32 has the structure illustrated in FIG. 6 for the first stage and consists of a 5-input NOR gate 34, a 4-input OR gate 36, a 2-input NOR gate 38 receiving the outputs of the NOR gate 34 and OR gate 36, and a 2-input exclusive-OR gate 40 receiving the output of the 2-input NOR gate 38 and the polarity change signal PC. If the capability to change polarity is not required, the exclusive-OR gate 40 can be eliminated for further savings in time. The 5-input NOR gate 34 receives bit signals $s_i$ for the starting address and for further stages the grounded connection to the NOR gate 34 is replaced by the output $o''$ from the look ahead circuit 32 of the previous stage. The OR gate 36 receives bit signals $e_i$ for the ending address. For further stages, the grounded input to the OR gate 36 is replaced by the fourth bit signal $e_i$ for the ending address. The output $o'_3$ of the 2-input NOR gate 38 has the same value as the output $o_3$ of the ripple circuit 30 of FIG. 5. However, there are only three delay periods involved in calculating the look ahead signal $o'_3$ while there are up to five delay periods required in calculating the output signal $o_3$. In fact, the time delay in calculating the signal $o''$ is more important for overall timing and this delay is three periods less than for $o_3$. This savings of time is multiplied approximately by the number of stages in the mask generator.

Therefore, the mask generator of FIG. 4 offers faster response at a penalty of more circuitry. Nonetheless, the calculation of a 32-bit mask takes a considerable time.

SUMMARY OF THE INVENTION

Accordingly, an object of the invention is to provide a mask generator with a reduced time required for calculation of the mask.

A further object of the invention is to provide a mask generator with a reduced number of circuit elements.

The invention can be summarized as a mask generator having two ripple circuits, preferably operated with look ahead carries, in which one ripple circuit ripples toward the center of the mask from one end and the other ripple circuit ripples toward the center from the other end.

BRIEF DESCRIPTION OF THE DRAWINGS

FIG. 1 is a schematic of a conventional ripple mask generator.

FIGS. 2 and 3 are schematics of parts of the conventional mask generator.

DETAILED DESCRIPTION OF THE PREFERRED EMBODIMENT

Figure 7:
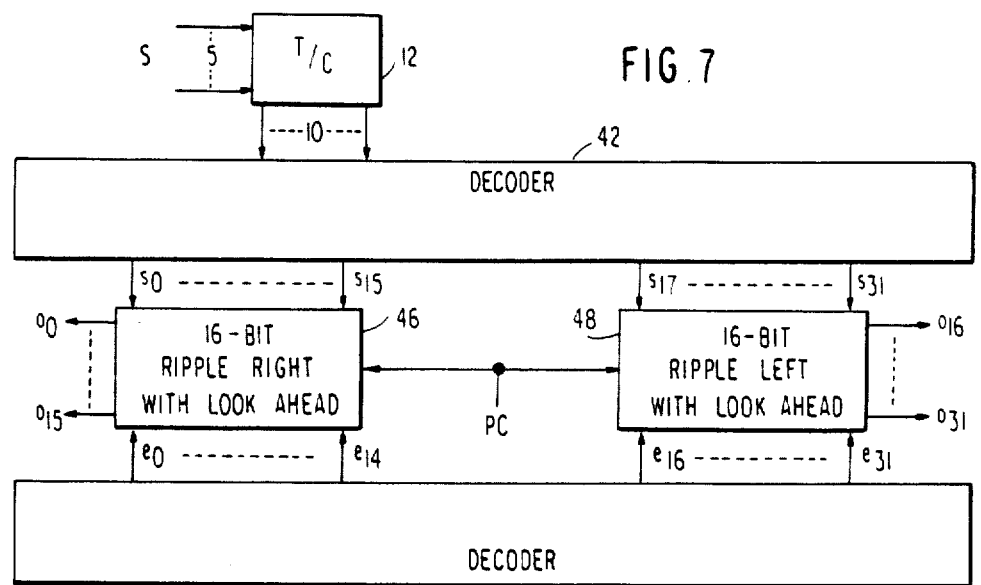
FIG. 7 is a block diagram of the mask generator of the invention.

The invention relies on the fact that a mask generator of the type described above can be rippled from either side. Even with the look ahead carries, there is a rippling action that can be performed simultaneously from both sides. An embodiment of the invention is illustrated in FIG. 7 for a 32-bit mask generator. The true and complementary circuits 12 and 14 are the same as those in FIG. 4 and produce true and complementary versions of the input bit signals for the starting and ending addresses S and E. Decoders 42 and 44 decode the 5-bit starting and ending addresses S and E and select one of their outputs. These decoders 42 and 44 are similar to those of FIG. 4 except that it is only required that the starting address decoder 42 have outputs $s_0$-$s_{15}$ and $s_{17}$-$s_{31}$ and that the ending address decoder 44 have outputs $e_0$-$e_{14}$ and $e_{16}$-$e_{31}$. The lower order address signals $s_0$-$s_{15}$ and $e_0$-$e_{14}$ are fed to a 16-bit right ripple circuit 46 which preferably includes look ahead and which outputs the lower order bits $o_0$-$o_{15}$ of the mask. The higher order address signals $s_{17}$-$s_{31}$ and $e_{16}$-$e_{31}$ are similarly fed to a 16-bit left ripple circuit 48 which preferably also includes look ahead and which outputs the lower order bits $o_{16}$-$o_{31}$. If desired, the polarity change signal PC controls the polarity of the mask.

Figure 4:
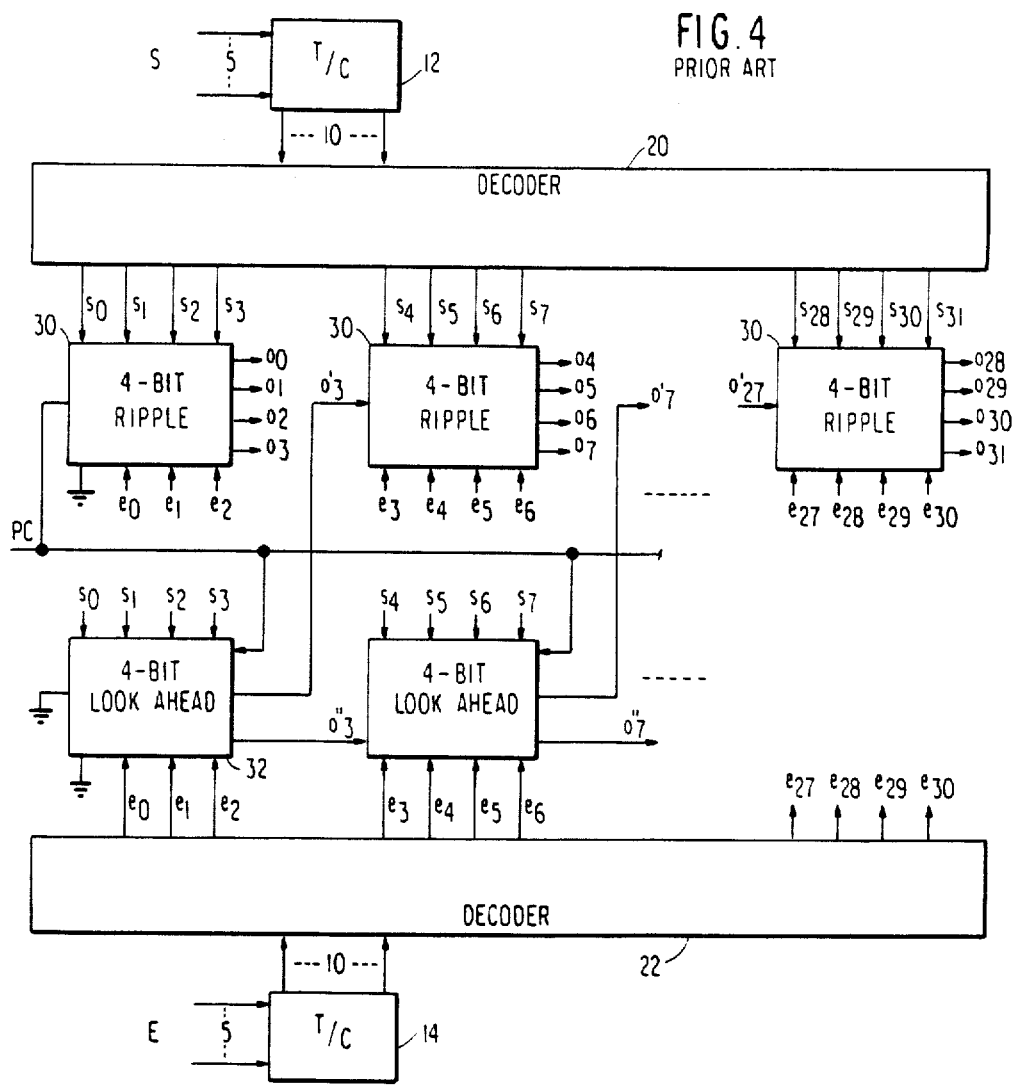
FIG. 4 is a block diagram of a prior art ripple mask generator with look ahead.
Figure 5:
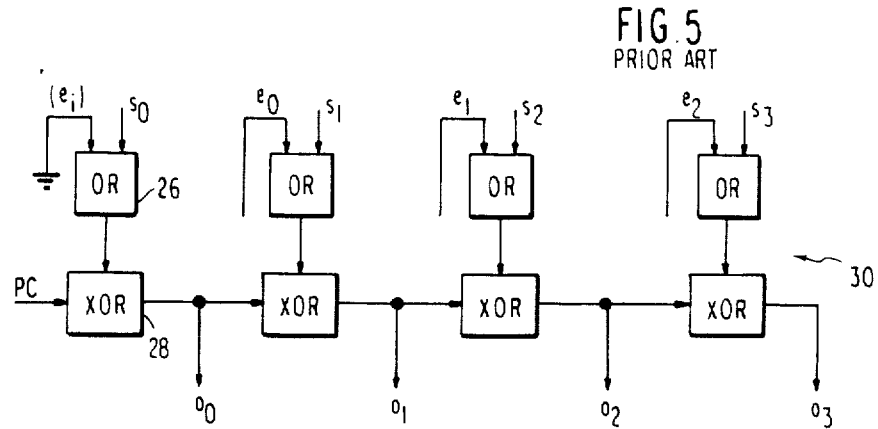
FIGS. 5 and 6 are schematics of parts of the mask generator of FIG. 4.
Figure 6:
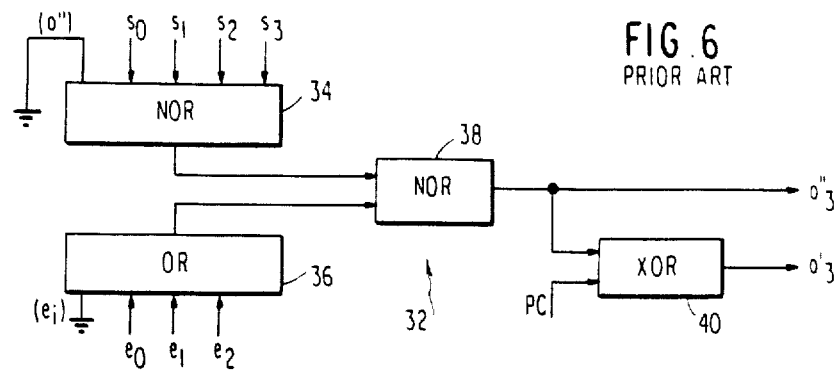
Figure 8:
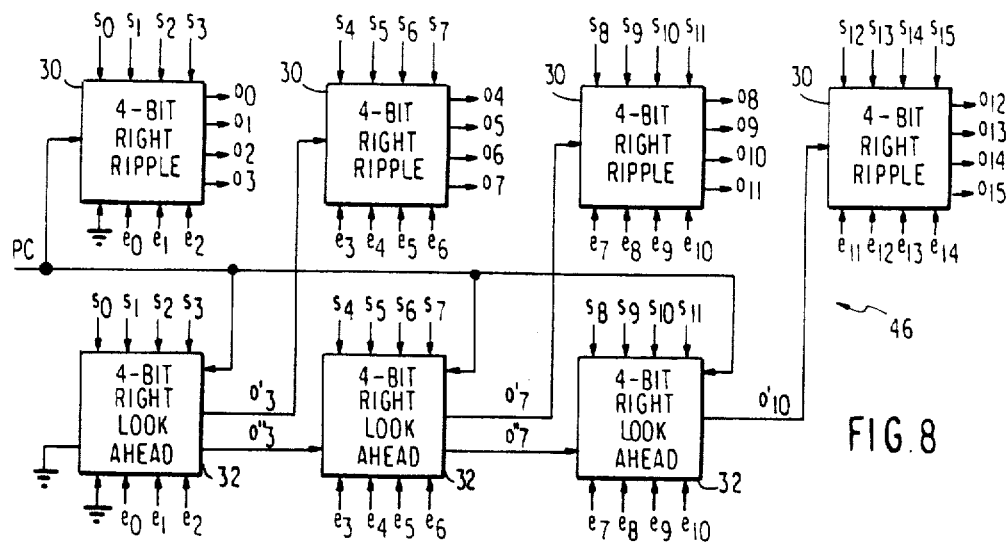
FIGS. 8 and 9 are block diagrams of the important parts of FIG. 7.

The right ripple circuit 46 is very similar to the circuitry of FIG. 4 but is only half as long. As illustrated in FIG. 8, it consists of four 4-bit right ripple circuits 30 identical to that of FIG. 5 and of three 4-bit right look ahead circuits identical to that of FIG. 6. It is noted that the series connection of the look ahead circuits 32 has a ripple effect somewhat similar to that of the ripple circuits 30.

Figure 10:
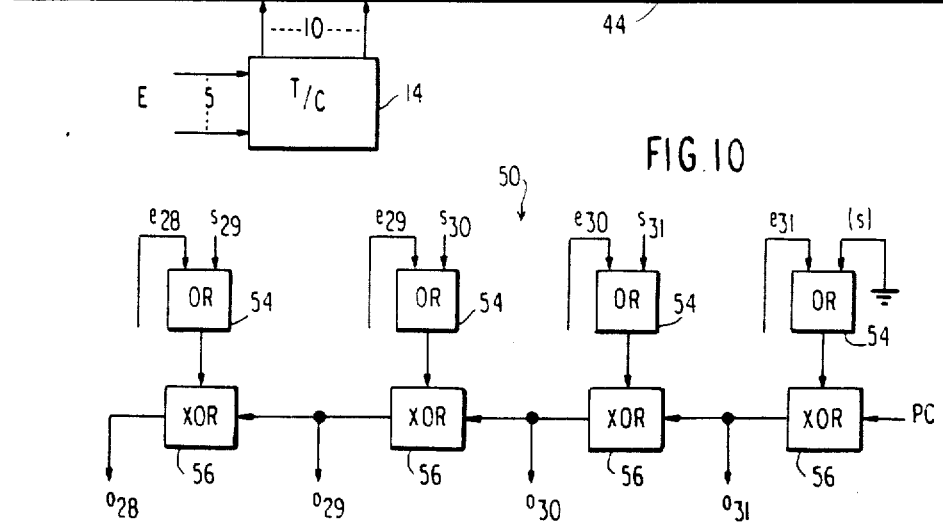
FIGS. 10 and 11 are schematics of parts of FIG. 9.
Figure 9:
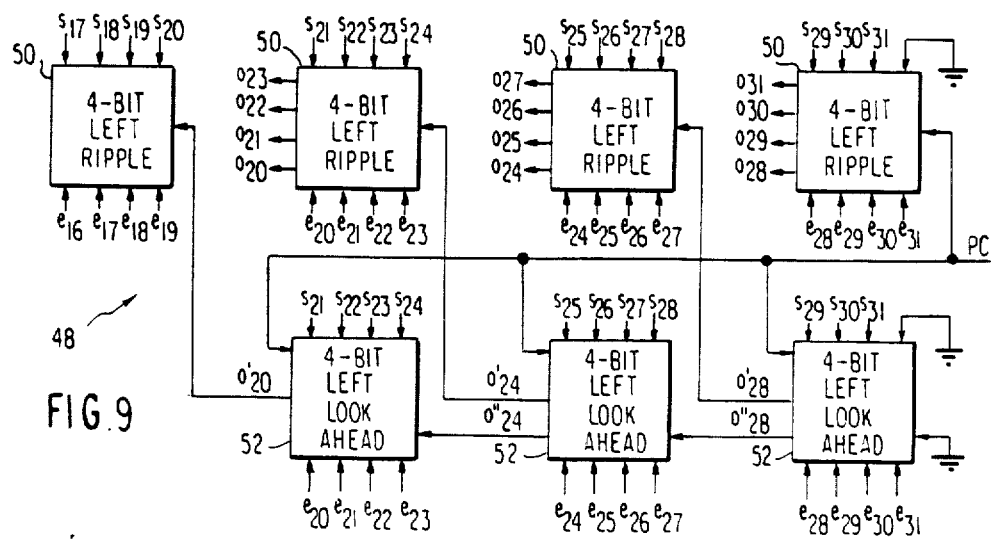
Figure 11:
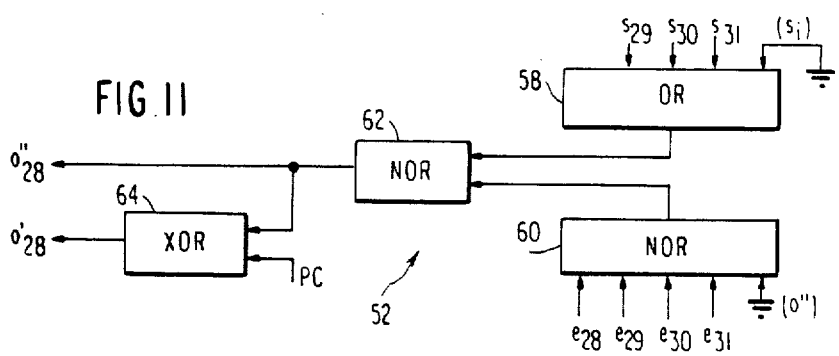

The left ripple circuit 48 is illustrated in FIG. 9 and is seen to be similar. It consists of four 4-bit left look-ahead circuits 50 and three 4-bit left ripple circuits 52. For the sake of completeness, the structure of the 4-bit left ripple circuit 50 is illustrated in FIG. 10 for the rightmost stage and the 4-bit left look ahead circuit 52 is illustrated in FIG. 11. The left ripple circuit 50 consists of four 2-input OR gates 54 and four 2-input exclusive-OR gates 56. The grounded connection to the rightmost OR gate 54 is replaced by the highest order bit of the four bit signals $s_i$ for the starting address. The left look ahead circuit 52 consists of a 4-input OR gate 58, a 5-input NOR gate 60, a 2-input NOR gate 62 and a 2-input exclusive-OR gate 64. The grounded input to the OR gate 58 is replaced by one of the four 1-bit starting address signals for the stages to the left. The grounded input to the 5-input NOR gate 60 is replaced in stages further to the left by the signal $o''$ supplied from the stage to the right.

The most remarkable result of the invention is that the total delay time for producing the mask is reduced almost by half since the signals can ripple in parallel from both ends of the mask generator to its center. That is, there are only half as many stages in the delay path. This significant reduction is accomplished without a significant increase in circuit complexity. Indeed, a comparison of FIGS. 8 and 9 with the prior art of FIG. 4 shows that the faster circuit of the invention eliminates the need for one 4-bit look ahead circuit. There is a further saving of one NAND gate in the decoders. Otherwise, the significant improvements of the invention are accomplished principally by rearranging the connections between elements.

The various circuit elements described for the mask generator can be built in any number of technologies. However, it is preferred that CMOS technology be used, as is described by Mead and Conway in their well known book "Introduction to VLSI". It is also preferred that the mask generator be included within a single integrated circuit incorporating the processor of a digital computer.

The invention can be generalized to a mask having more than one central fields as long as the decoders can accept multiple inputs and select more than one output. However, overlapping of fields presents problems in this generalization.

What is claimed is:

1. A mask generator responsive to a starting address and an ending address for generating a mask word having a plurality of mask bits of a first logical level and a plurality of mask bits at a second logical level, with said plurality of mask bits of said first logical level beginning and ending at start and end positions in said mask word defined by said beginning and ending addresses, respectively, said mask generator comprising:
   decoder means for decoding said beginning and ending addresses and for providing a plurality of start outputs corresponding to said start address and a plurality of end outputs corresponding to said ending address;
   first ripple circuit means responsive to at least portions of each of said start and end outputs for generating a first ripple portion output including a plurality of bits forming a first portion of said mask word, said first ripple circuit, when said starting address indicates a start position within said first portion of said mask word, generating a first logical level signal propagating from said start position in said mask word towards a higher order bit position thereof; and
   second ripple circuit means responsive to at least portions of each of said start and end outputs for generating a second ripple circuit output including a plurality of bits forming a second portion of said mask word, said second ripple circuit, when said ending address indicates an end position in said second portion of said mask word, generating a first logical level signal propagating from said end position in said mask word towards a lower order bit position thereof.

2. A mask generator as recited in claim 1, wherein each of said ripple circuit means comprises a plurality of ripple circuits connected in series.

3. A mask generator as recited in claim 1, wherein said first and second ripple circuit means comprise look-ahead carry circuits.

4. A mask generator as recited in claim 1, wherein said first and second ripple circuits are responsive to mutually exclusive portions of said start and end outputs.

5. A mask generator for generating a mask word having a plurality of bits including at least one field of a first logical level extending from a start position to an end position, said mask generator comprising:
   a plurality of binary starting signal lines carrying respective binary starting signals, a selected one of which indicates said start position;
   a plurality of binary ending signal lines carrying respective binary ending signals, a selected one of which indicates said end position;
   a first ripple circuit means connected to lower order ones of said binary starting and ending signal lines for forming a lower order portion of said mask word and rippling said first logical level from said start position of said mask word to a higher order position of said mask word when said start position is within said lower order portion of said mask word; and
   a second ripple circuit means connected to higher order ones of said binary starting and ending signal lines for forming a higher order portion of said mask word and rippling said first logical level from said end position to a lower order position of said mask word when said end position is within said higher order portion of said mask word.

6. A mask generator as recited in claim 5, wherein each of said first and second ripple means comprises:
   a plurality of second-level ripple circuits each connected to a different set of binary starting and ending signal lines; and
   at least one look-ahead carry circuit connected to a same set of said binary starting and ending signals as one of said second-level ripple circuits and providing an input to another of said second-level ripple circuits.

7. A mask generator as recited in claim 6, wherein each of said second-level ripple circuits comprises a plurality of OR gates each receiving a respective one of said binary starting signal lines and a respective one of said binary ending line signal lines, said binary starting and ending line signals connected to said OR gate differing by one position corresponding to said mask.

8. A mask generator as recited in claim 7, wherein each of said second-level ripple circuits further comprises an exclusive-OR gate receiving an output of said OR gate in said each second-level ripple circuit.

9. A mask generator as recited in claim 8, wherein said look-ahead carry circuit comprises a first OR circuit receiving a plurality of binary starting signal lines, a second OR circuit receiving a plurality of binary ending signal lines, and logic means for combining outputs of said first and second OR circuits to produce an output having a value corresponding to an output of one of said second-level ripple circuits.

10. A mask generator as recited in claim 9, further comprising two decoders receiving binary encoded starting and ending signals and selecting respective ones of said binary starting and ending signal lines.

* * * * *